United States Patent
Neumann

[15] 3,659,947
[45] May 2, 1972

[54] HOLOGRAPHIC APPARATUS WITH AUTOMATIC CONTROL SYSTEM FOR MAINTAINING CONSTANT PHASE RELATION BETWEEN REFERENCE AND OBJECT BEAMS

[72] Inventor: Don B. Neumann, Ann Arbor, Mich.
[73] Assignee: GCO, Inc., Ann Arbor, Mich.
[22] Filed: June 18, 1970
[21] Appl. No.: 47,291

[52] U.S. Cl. ............................. 356/106, 250/201, 350/3.5
[51] Int. Cl. ................................. G02b 27/00, G01j 1/20
[58] Field of Search ..................... 350/3.5; 356/106, 206; 250/237 G, 201, 204

[56] References Cited

UNITED STATES PATENTS 3,489,906  1/1970  Beer ........................... 356/206
3,494,698  2/1970  Neumann ..................... 350/3.5

OTHER PUBLICATIONS

Neumann et al., Applied Optics, Vol. 6, No. 6, June 1967 pp. 1097–1104
Cook et al., Jour. of Research of the NBS - Part C, Vol. 65C, No. 2, June 1961, pp. 129–140

Primary Examiner—David Schonberg
Assistant Examiner—Ronald J. Stern
Attorney—McGlynn, Reising, Milton & Ethington, Martin J. Adelman, Allen M. Krass, Owen E. Perry, Thomas N. Young and Stanley C. Thorpe

[57] ABSTRACT

Apparatus for making holograms is disclosed which includes an arrangement for maintaining a constant phase relationship between the object and reference beams so that the fringe pattern remains stationary during the recording period. The apparatus includes means for detecting spurious motion of the object or elements of the apparatus by means responsive to the intensity of a portion of the wavefront interference pattern. The detection signal which is taken as being indicative of a phase shift between the reference and object waves is applied to an automatic control system including amplifying means and a transducer disposed in one of the beam paths for producing a corrective phase shift thereof relative to the other beam. The quiescent operating point for the automatic control system is established by an automatic bias system which includes means for producing a signal corresponding to the average value of the intensity of the wavefront interference pattern. In one preferred embodiment a bias signal corresponding to the average value of intensity is developed by a detector with means forming a portion of the interference pattern thereon with the fringe lines being spaced such that the detector responds to an area including both constructive and destructive regions of the interference pattern.

11 Claims, 15 Drawing Figures

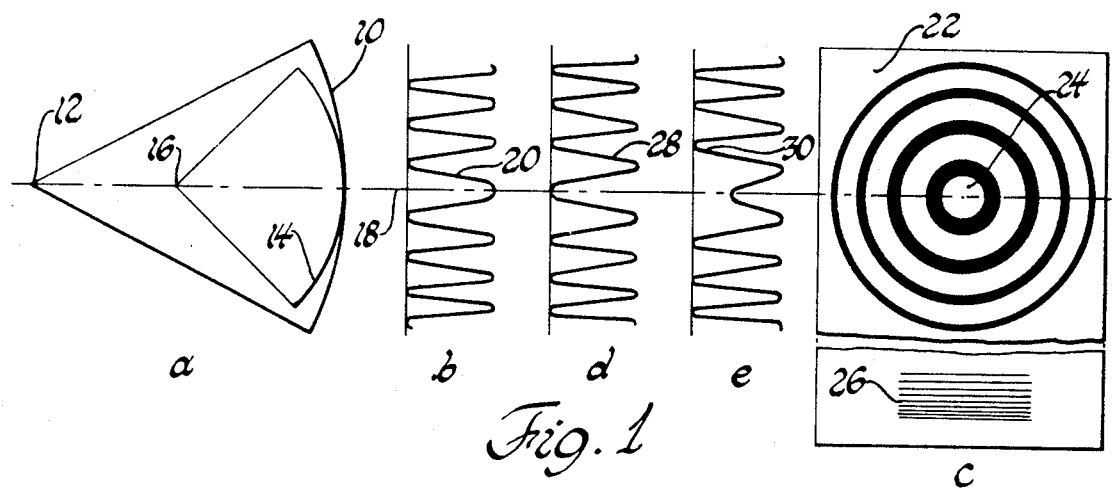
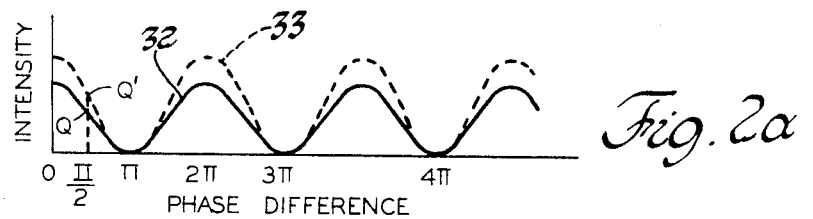
Fig. 2a
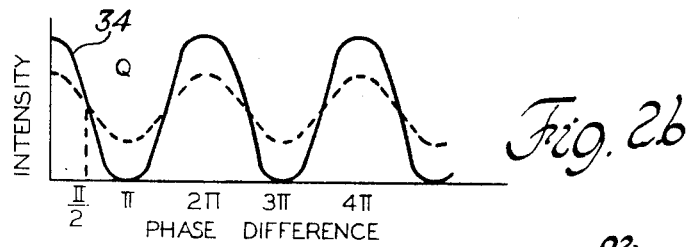
Fig. 2b
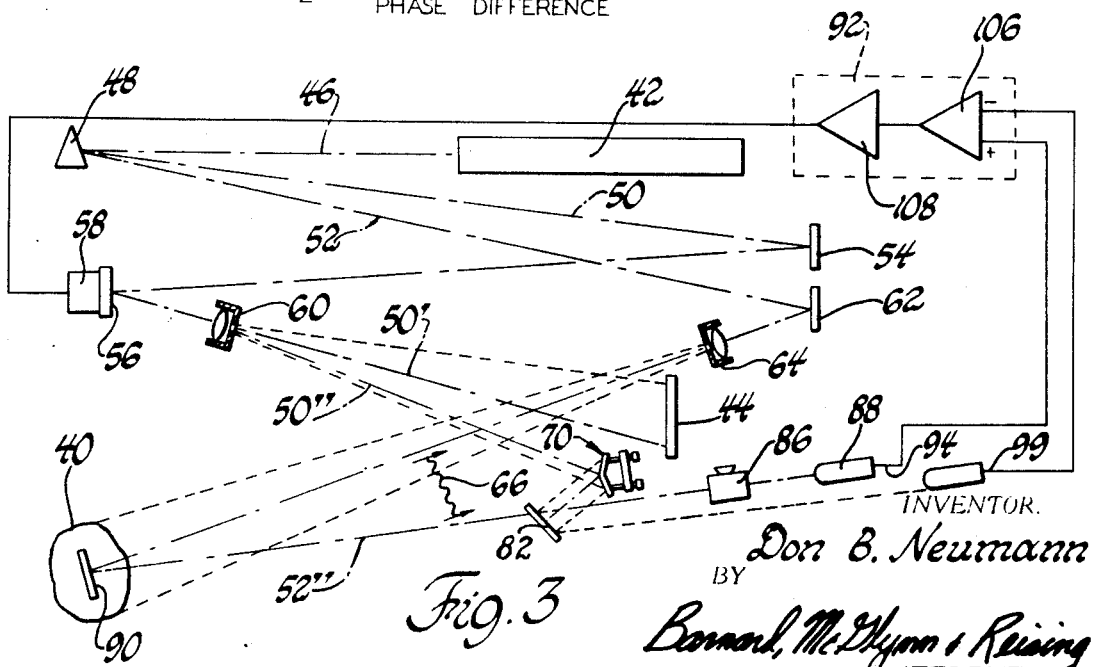
Fig. 3
INVENTOR.
Don B. Neumann
BY
Bernard, McGlynn & Reising
ATTORNEYS Patented May 2, 1972  3,659,947

INVENTOR.
Don B. Neumann
BY
Barnard, McGlynn & Reising
ATTORNEYS

Patented May 2, 1972

INVENTOR.
Don B. Neumann
BY
Barnard, McGlynn & Reising
ATTORNEYS

HOLOGRAPHIC APPARATUS WITH AUTOMATIC CONTROL SYSTEM FOR MAINTAINING CONSTANT PHASE RELATION BETWEEN REFERENCE AND OBJECT BEAMS

This invention relates to holography and, more particularly, to an improved system and apparatus for making holograms.

As is well known, holography is an image forming process in which a wavefront interference pattern is recorded and wavefront reconstruction therefrom is used to produce an image of a three-dimensional object. In the recording stage of reference beam, formed by a source of coherent wave energy, is caused to impinge upon the surface of the recording medium and an object beam formed from the coherent wave energy modified by reflection from or transmission through the object is also caused to impinge upon the surface of the recording medium. The two wavefronts taken together and superposed in the space occupied by the recording medium produce an interference pattern comprised of fringe lines which when recorded constitutes the so-called hologram. In the reconstruction stage the image of the object may be reconstructed by illuminating the hologram by a wavefront identical to that of the reference beam and diffraction at the hologram recreates the object wavefront. An observer looking through the hologram sees an image in three-dimensions.

Since the process of holography depends upon the recording of wavefront interference patterns, it is important to precisely record the interference fringe lines. The fringe lines are spaced at distances which are usually a few wavelengths of the coherent wave energy and thus any perturbation in relative phase of the two beams moves the intensity pattern causing a poor recording and hence a dim reconstruction of the wavefront. An important practical application of holography is that of holographic interferometry in which the reconstructed wavefront of an object is compared with the object itself, as in real time analysis or it is compared with the reconstructed wavefront from another hologram of the object, as in double exposure holographic interferometry. As is now well known, such a technique yields precise information regarding the most minute displacement or deformation of the object.

In such applications of holography a change in the relative phase of the reference and object beams during the exposure process will result in a movement of the interference fringe lines and hence a degraded hologram. A change in the phase relation of the beams may be caused by a change in optical path length of one of the beams; changes of even a fraction of a wavelength will have a significant effect on the resulting hologram. To avoid this difficulty it has heretofore been the practice to stabilize the object and the components of the holographic apparatus during the recording of the hologram. Physical stabilization, however, is not practical in many applications of holography.

There has remained an important problem in respect to maintaining a constant phase relation between the object and reference beams in making holograms so that the fringe pattern on the recording medium remains stationary during the recording period. In a particular form this problem is that of eliminating the effect of spurious object motion relative to the holographic apparatus during the recording period.

One previous solution to this problem is set forth in my U.S. Pat. No. 3,494,698 entitled "Feedback Control Device For Stabilization of Interference Fringes" granted Feb. 10, 1970 and assigned to the United States Government. In that patent there is disclosed a system for sensing the motion of the interference fringe pattern and applying a corrective signal to a transducer in one of the beams for changing the path length thereof to change the relative phase of the reference and object beams and thereby nullify the motion of the interference pattern. As disclosed therein, portions of the object and reference beams are brought together at a small angle to form a fringe pattern separate from that which occurs at the surface of the recording medium. This separate pattern is magnified by a suitable lens and imaged on a slit placed in front of a photodetector. The signal from the photodetector is amplified and applied to a transducer of piezoelectric crystal which supports a mirror in the path of the reference or object beam. A phase shift of either the object beam or the reference beam causes the hologram fringe pattern and the separate fringe pattern to shift correspondingly. The shift of the interference fringe pattern over the slit causes the photodetector output signal to change by an amount and direction corresponding to the phase shift. This change of signal, as applied to the transducer, causes a movement of the mirror in such a direction and amount that the phase disturbance is nullified. Since the spacing between fringe lines in a wavefront interference pattern is inversely proportional to the angle between the wavefronts, the interference pattern is comprised of closely spaced fringe lines which must be magnified prior to impingement upon the slit. Such magnification reduces the power density at the photodetector and a high degree of amplification of the output is required.

This difficulty has been overcome by an improvement as set forth in my copending patent application Ser. No. 853,799 entitled "Apparatus For Forming Holograms Employing Beam Equalization For Object Movement," filed Aug. 28, 1969 and assigned to the same assignee as the present application. In the improvement set forth in that patent application, portions of the reference beam and the object illuminating beam are directed parallel to each other along a common path thus forming an interference wavefront pattern of circular fringe lines. A photodetector is disposed on the axis of the common path and the intensity at the center of the interference pattern is taken as an indication of the phase relation between the reference and object beams. This arrangement permits the elimination of such optical elements as the slit and the magnifying lenses and thus increases the quantity of light reaching the photodetector.

Although such systems heretofore developed for nullifying the effect of phase disturbance such as might be produced by object motion have greatly improved the quality of holograms, there has remained a problem in operation of the automatic control system. In order for the automatic control system to nullify a relative phase shift between the reference and object beams in either direction, it is required that the phase changing means be operable in a reversable or bidirectional sense over a dynamic range corresponding to the unwanted phase shift. In the case of an automatic control system of the type utilizing a movable mirror in one beam path as the phase correction means, the driving motor therefore, such as an electromechanical transducer, must be reversible. Thus, the servo loop including the phase shift detector, the servo amplifier, the reversible motor and the phase correction device must have a quiescent operating point or Q point somewhere near the midpoint of the dynamic range or at least well within its limits. For this purpose it has been necessary in the previous systems for the operator to manually establish the quiescent operating point as by the adjustment of a bias or off-set voltage in the servo amplifier to offset the steady state component of the signal voltage produced by the steady state value of illumination falling upon the detector. Desirably, these initial conditions are established with the phase relationship between the reference and object beams such that the illumination falling upon the detector is at a value about half-way between maximum and minimum. The establishment of the initial conditions, including the quiescent operating points of the system by manual adjustment is a very tedious and time-consuming job. Furthermore, the system thus established is subject to errors by reason of a change of intensity of the illuminating source, such as would result from the fluctuation of the power supply for the laser. Such a change produces a false response of the automatic control system because the illumination intensity in the interference pattern is utilized as an indication of the phase relation between the object and reference beams and the system does not distinguish between an intensity change caused by phase shift and intensity changes from other causes.

In accordance with this invention, the problems of establishing the quiescent operating point for the automatic control system are solved by providing an automatic bias system. In general, this is accomplished by providing means for producing a signal corresponding to the average value of the intensity of the wavefront interference pattern for establishing the quiescent point of operation of the automatic control system. By means of the invention, the manual adjustment of the bias on the servo amplifier is avoided. This is accomplished by utilizing additional detector means to develop a bias voltage corresponding to the average value of intensity of the reference beam and object illuminating beams which is effectively the same as the space average value of intensity of the interference pattern. Additionally, according to the invention the inaccuracies arising from changes in illumination intensity are eliminated. This is achieved because the detector means output varies with changes in the average value of illumination intensity and is independent of localized changes in the interference pattern as are induced by phase shift and, accordingly, the quiescent point of operation is adjusted thereby to avoid false response of the control system. In accordance with one embodiment of the invention, the average value of intensity is developed by a detector with means forming a portion of the interference pattern thereon with the fringe lines being spaced such that the detector responds to an area including both constructive and destructive regions of the inteference pattern. Alternatively, the space average value may be derived by the detector by combining the portions of the wavefronts of the reference and object illuminating beams on the detector with means for spoiling the spatial coherence thereof to produce an area of substantially uniform intensity. In another embodiment, the space average value may be obtained by time modulating the relative phase of the object and reference beams and taking a time average of the detector output over many cycles of the modulating frequency. In another embodiment the intensities of the reference beam and the object illuminating beam are separately detected and signals corresponding thereto are combined to produce a signal corresponding to the average value.

A more complete understanding of this invention may be obtained from a detailed description which follows taken with the accompanying drawings in which:

FIG. 1 is a diagram representing wavefront interference for different phase relationships;

FIG. 2a is a graphical representation of the intensity variation as a function of phase difference between equal amplitude interfering wavefronts;

FIG. 2b is a similar representation for the cases where the wave amplitudes are unequal;

FIG. 3 is a diagram of the inventive holographic apparatus;

Figure 4:
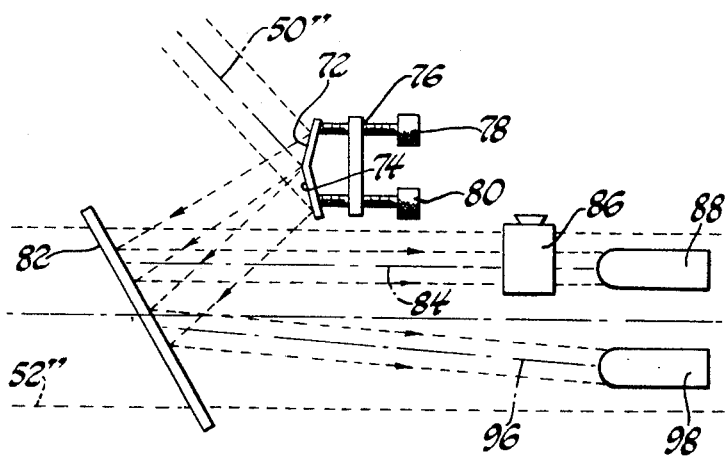
FIG. 4 shows the details of a portion of a system of FIG. 3.

Referring now to the drawings, there is shown an illustrative embodiment of the invention in apparatus for producing holograms by illuminating an object with coherent laser light and recording with a high resolution photographic plate. The illustrative embodiment may be employed in applications of holography where it is desired to nullify the effects of phase disturbance between the object and reference beams, such as may be caused by unwanted motion of the object or other elements of the holographic apparatus. The invention will be described with reference to a system of the type set forth by above-mentioned patent application Ser. No. 853,799.

Referring now to FIGS. 1 and 2, it will be helpful in understanding the present invention to consider the interference pattern produced by two spherical wavefronts in relation to the phase displacement therebetween. As shown in FIG. 1, a spherical wavefront 10 emanating from a point source 12 and a spherical wavefront 14 emanating from a point source 16 are coincident with each other and have a common axis 18. The wavefronts 10 and 14 are assumed to be coherent in space and time and, in fact, may be produced from a single laser beam with suitable optics. A wavefront, such as 10 or 14, is a surface on which the wave energy at any point is in phase with the wave energy at any other point. It is noted that the wavefronts 10 and 14 are coincident or tangent at the axis 18 and assuming that these wavefronts represent the maximum amplitude of the respective waves, then they are in phase with each other along the axis 18. Such a condition is represented by the interference pattern of FIG. 1b wherein the intensity distribution as a function of displacement from the axis 18 is plotted. The FIGS. 1b, 1d and 1e are drawn assuming equal amplitudes of the waves 10 and 14. If the waves are unequal in amplitude, the following remarks are true, but the destructive interference intensities are not zero as shown. It is noted that with the wavefronts in phase with each other along the axis 18 the intensity curve 20 is at a maximum value on the axis. However, because of the difference in radius of the wavefronts, the phase relationship changes as a function of displacement from the axis 18 and the intensity curve is a waveform of successive maximum and null points of increasing frequency corresponding to the occurrence of constructive and destructive interference regions caused by the variations in the phase relationship. As shown in FIG. 1c, this produces on a screen 22 an interference pattern which is comprised of concentric circular fringe lines. It is to be noted that a bright circular area 24 occurs on the axis 18 and is surrounded by spaced fringe lines of decreasing radial spacing and thickness, i.e., the fringe lines become increasingly fine and closely spaced with increasing distance from the axis 18 as indicated by the fringe line area 26.

If the wavefronts 10 and 14 are displaced by one-half wavelength (phase difference of $\pi$ radians), then the coinciding wavefronts on the axis 18 will interfere in a destructive sense and produce annulment as indicated by the intensity waveform 28 of FIG. 1d. This annulment obtains at any point along the axis 18 and thus produces a central circular dark spot in the interference pattern surrounded by fringe lines of continuously decreasing width and spacing. If the wavefronts 10 and 14 are displaced by one-quarter wavelength (phase difference of $\pi/2$) on the axis 18 then the intensity of the central circular area will be at an intermediate value. The intensity distribution, as shown in the waveform 30 of FIG. 1e, includes a double-hump curve on the axis 18 surrounded by fringe lines as previously described.

It will now be appreciated that the intensity of the wave energy along the axis 18 of the wavefronts 10 and 14 varies in a sinusoidal manner as a function of the phase difference between the wavefronts. This relationship is illustrated in FIG. 2a showing a graphical representation of the relationship between intensity and phase difference as indicated by the curve 32. It is noted that the intensity is a maximum when the phase difference is equal to zero or an even integral number times $\pi$ radians, indicated at $2\pi$ and $4\pi$ and is at a minimum value when the phase difference is an odd integral number times $\pi$ radians, as indicated. When the phase difference between the two wavefronts is equal to $\pi/2$ radians, the intensity is at an intermediate value as discussed with reference to FIG. 1e and as shown in FIG. 2a. When a phase difference of $\pi/2$ radians is established between the wavefronts, the intensity corresponding thereto has a value of Q and it is noted that a decrease of phase difference will produce an increased intensity and an increase of phase difference will produce a decrease of intensity over a phase difference range from zero to $\pi$ radians. It is to be noted also that the curve 32 has an amplitude at any point which varies with the intensity of the sources 12 and 16 of wave energy. Therefore, the measurement of intensity along the beam axis 18 does not provide a reliable indication of phase relationship between the beams or wavefronts since the same change in intensity might be produced by a variation in the source intensity. Equal wave intensities (10 and 14) of higher value would produce an intensity curve 33 and at a phase difference of $\pi/2$ radians there would be an intensity value Q' along the axis 18.

Furthermore, as shown in FIG. 2b, a change in the ratio of the amplitudes of waves 10 and 14 with no change in the total average intensity of both waves will result in a change to the intensity variation profile 34 from a profile 32 which results for the case of a unity ratio (equal wave amplitudes). It can be seen that such a change in wave amplitude ratio results in a change of intensity for phase differences other than those for which the intensity is average, such as Q, at a phase difference of $\pi/2$ radians.

Thus it can be seen that an automatic control system which is capable of nullifying phase disturbances between the reference and object beams or wavefronts must be immune or unresponsive to changes in the intensity which are caused by anything other than phase shift. Such a system, in accordance with this invention is set forth in the diagram of FIG. 3. In this system it is desired to produce a hologram of an object 40 with holographic apparatus including a laser 42 as a source of coherent light and a recording medium in the form of a photographic plate 44. The laser 42 produces a coherent beam 46 which impinges upon a beam splitter 48 in the form of a prism which divides the beam 46 into a reference beam 50 and an object illuminating beam 52. The reference beam 50 impinges upon a mirror 54 and is reflected thereby to a mirror 56 which is movably mounted upon an electromechanical transducer 58 which will be described in greater detail subsequently. The reference beam is redirected by the mirror 56 through a spatial filter 60 suitably in the form of a lens-pinhole arrangement. The spatial filter produces an expanded reference beam 50' and causes it to illuminate the surface of the photographic plate 44.

The object illuminating beam 52 formed by the beam splitter 48 impinges upon a mirror 62 and is redirected thereby through a spatial filter 64 which expands the beam and causes illumination of the object 40 thereby. The wave energy reflected from the object 40 forms an object beam 66 which is directed toward the photographic plate 44 and is superposed with the reference beam in the space occupied by the surface of the photographic plate 44. The system thus far described is adequate for the production of a hologram since the reference beam 50 and the object beam 66 will produce an interference pattern on the photographic plate and will be recorded thereby. However, in the event of motion of the object or any other element of the apparatus during the exposure of the photographic plate, there will be a relative phase shift between the object and reference beams causing a shift of the fringe lines in the interference pattern and hence a degrading of the hologram. As a result, upon illumination of the hologram and reconstruction of the object wavefront, the image of the object will be dimmed.

Accordingly, the holographic system just described is additionally provided with an automatic control system for nullifying phase disturbances. For this purpose there is provided means for producing an interference pattern between a portion of the reference beam and a portion of the object illuminating beam. Such means suitably includes a beam combiner 70 positioned adjacent the photographic plate 44 in the path 50'' of a portion of the reference beam 50'. The beam combiner 70, shown in FIG. 3 and in greater detail in FIG. 4, includes a mirror 72 and a mirror 74 disposed at a fixed slight angle relative to each other and mounted for angular adjustment on a block 76 by a pair of thumb screws 78 and 80. A part of the reference beam 50' impinges upon the mirror 72 and is reflected thereby onto a partially reflecting mirror 82 from whence it is reflected along an axis 84 through a beam viewing beam splitter 86 to the optical input of a photodetector 88. In order to produce the desired interference pattern at the optical input of the photodetector 88 a reflector 90 is mounted upon the object 40 for movement therewith. A portion of the object illuminating beam 52' is reflected thereby along a beam path 52'' and retains its spatial coherence but suffers the same phase disturbances as the object beam 66 upon the occurrence of any motion of the object 40. The beam path 52'' extends through the partially reflecting mirror 82 and thence through a viewing beam splitter 86 to the optical input of the photodetector 88. By use of the viewing beam splitter 86 and the thumb screws of the beam combiner 70 the object illuminating beam on path 52'' and the reference reflected from beam path 50'' along axis 84 may be brought into coincidence. An observer looking into the beam splitter 86 will see two light spots corresponding to the different beams when they are separated. By manipulation of the thumb screws 78 and 80 the mirror 72 may be inclined to cause the beams to become aligned as indicated by coincidence of the two bright spots in the viewing beam splitter. Thus, an interference pattern of circular fringe lines, as previously discussed, will be formed at the optical input of the photodetector 88.

The automatic control system for nullifying phase disturbance further includes a servo amplifier 92 and the electromechanical transducer 58 which is drivably connected with the movable mirror 56. The electrical output 94 of the photodetector 88 is connected to the input of the servo amplifier 92, and the output thereof is connected to the transducer 58 for energization thereof. The transducer 58 suitably takes the form of a piezoelectric crystal and is adapted to undergo bilateral rectilinear motion under the influence of a variable driving voltage applied thereto. Accordingly, the transducer is operable as a reversible rectilinear motor and is suitably coupled to the mirror 56 to change the path length of the reference beam 50 and thereby change the relative phase between the reference beam and the object beam. At the same time the relative phase is changed between the reference beam on path 50'' and the object illuminating beam on path 52''.

Figure 4A:
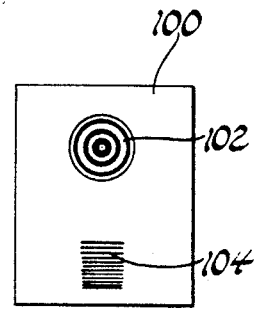
FIG. 4a shows the interference pattern produced by the system of FIG. 3.

As previously discussed, the automatic control system is provided with automatic means for establishing the quiescent point of operation and which is referred to herein as an automatic bias adjustment. For this purpose, means are provided to develop a bias quantity which corresponds to the average value of intensity of the wave energy forming the interference pattern at the optical input of the photodetector 88. The value of intensity of interest for the use in the automatic bias control is equivalent to the space average value, i.e., the value obtained by integrating the intensity with respect to area divided by the total area, as distinguished from a time average value. To obtain such a space average value of intensity the reference beam on path 50'' is reflected from the mirror 74 at a fixed angle with reference to that reflected from the mirror 72 and is, therefore, reflected from the partially reflective mirror 82 at a fixed angle along an axis 96. Accordingly, the portion of the reference beam extending along axis 96 and the object illuminating beam on path 52'' are convergent in an area of overlap and produce an interference pattern of fine fringe lines. A photodetector 98 is disposed adjacent the photodetector 88 and has its optical input positioned in the overlap region of said beams so that the interference pattern is formed thereon. The interference pattern thus formed includes fringe lines which are spaced sufficiently closely that the photodetector responds to an area including both constructive and destructive regions of the interference pattern and thereby produces an electrical voltage output corresponding to the space average value of the intensity of the interference pattern. The interference patterns just described are illustrated in FIG. 4a which depicts the patterns as though projected upon an imaginary screen 100. The interference pattern formed on the axis 84 is comprised of circular fringe lines 102 whereas the interference pattern formed on axis 96 appears as closely spaced fine parallel fringe lines 104. The electrical output 99 of the photodetector 98 is connected to one input of a differential amplifier 106 in the servo amplifier and provides a bias voltage thereto. The electrical output of the photodetector 88 is connected to the other input of the differential amplifier 106 and supplies a signal voltage thereto. The output of the differential amplifier is applied to the input of a power amplifier 108 which produces the output of the servo amplifier 92 and is connected with the transducer 58 as previously described.

Figure 5:
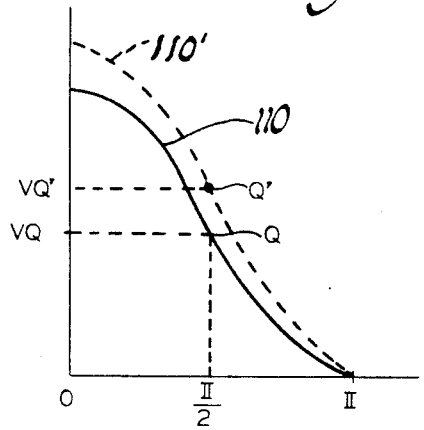
FIG. 5 is a graphical representation of the operating range of the apparatus of FIG. 3.

Operation of the inventive control system will now be described with reference to FIG. 3 and FIG. 5. With the laser 42 energized and the optical system properly aligned, it will be assumed that the reference beam and the object beam at the photodetector 88 are out of phase by one-quarter wavelength. As shown in FIG. 5 the signal voltage produced by the photodetector 88 as a function of phase displacement is represented by the curve 110. At a phase displacement of one-fourth wavelength the signal voltage has a value VQ which corresponds to the quiescent operating point Q on the curve 110. This signal voltage is applied to one input of the differential amplifier 106 and in order to offset the effect thereof the bias voltage developed by the photodetector 98 is applied to the other input of the differential amplifier 106. The bias voltage for this condition is automatically adjusted to have a value VQ. Accordingly, with equal input voltages applied to the inputs of the differential amplifier the output voltage thereof is at a reference or zero value and thus the voltage applied by the power amplifier 108 to the transducer 58 is at a corresponding value and the transducer is in its reference position. In the event of a phase disturbance, such as would be caused by movement of the object 40 in one direction which lengthens the path of the object beam, the phase difference between it and the reference beam will be increased to a value greater than one-fourth wavelength. Accordingly, the signal voltage developed by photodetector 88 is decreased while the value of the bias voltage developed by the photodetector 98 remains unchanged. Accordingly, the differential amplifier 106 develops an output voltage corresponding to the difference of the input voltages and a transducer 58 is energized to produce a displacement corresponding in direction and amount to the output voltage. The displacement of the mirror 56 thus increases the length of the path of the reference beam an amount which just nullifies the phase shift which would have been produced by the motion of the object 40. If the object should undergo another spurious movement, but this time in the opposite direction, the signal voltage developed by the photodetector 88 will increase and thus reduce the voltage developed by the differential amplifier 106 and applied through amplifier 108 to the transducer 58. Accordingly, the transducer and the mirror 56 will be moved in the reverse direction to compensate or nullify the effect of the motion of the object. It is thus seen that the quiescent point of operation of the automatic control system corresponds to the point Q on the voltage curve 110 and it will remain the same as long as the average intensity of the interference pattern remains constant. However, if by reason of a power supply fluctuation or the like the output beam of the laser 42 should increase in intensity, then a new voltage curve 110' is established for the photodetector 88 since an increased voltage is produced thereby for every value of phase difference between the reference and object beams. This change of source intensity is effective, of course, to change the space average value of the interference pattern which is formed on the optical input of the photodetector 98. Accordingly, the bias voltage developed thereby and applied to the input of the differential amplifier is changed to a new value VQ'. Thus, the quiescent operating point for the control system is changed to Q' but corresponds to the same value of phase difference between the reference and object beams. Since the signal voltage and the bias voltage values change together as a result of a change of source intensity, the output of the differential amplifier 106 is not changed and transducer 58 and mirror 56 remain unaffected. Thus, the system is effectively immune to changes in intensity of the source of wave energy. Furthermore, the quiescent operating point remains at the same relative position on the voltage curve despite changes of intensity of the reference and object beams. This insures a wide dynamic range of operation without driving the amplifier into saturation.

Figure 6:
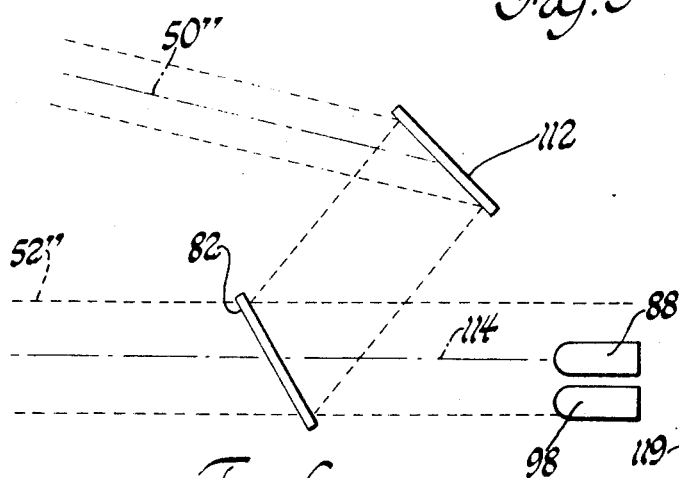
FIG. 6 shows a modification of the inventive apparatus.
Figure 6A:
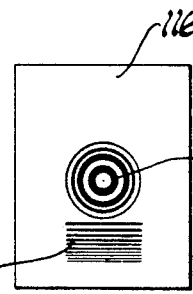
FIG. 6a shows the interference pattern produced by the modification of FIG. 6.

A modification of the inventive apparatus is shown in FIGS. 6 and 6a. In this modification the space average value of the intensity of the interference pattern is developed from a single pattern of fringe lines. For this purpose the portion of the reference beam on path 50'' impinges upon a single mirror 112 and is reflected thereby onto the surface of the partially reflective mirror 82 from whence it is reflected into parallelism and coincidence with the object illuminating beam on path 52'' along an axis 114. The photodetector 88 is positioned on the axis 114 and the photodetector 98 is positioned at an off-axis location. As shown in FIG. 6a the interference pattern on an imaginary screen 116 is comprised of circular fringe lines 118 centered on the axis 114 and thus the photodetector 88 sees the same interference pattern as in the system of FIG. 3. The fringe pattern at a substantial distance from the axis 114 is comprised of a group 119 of fine closely spaced fringe lines. Thus, the photodetector 98 is positioned so that this group 119 of fringe lines impinges thereon and sees the same kind of interference pattern as described with reference to FIG. 3.

Figure 7:
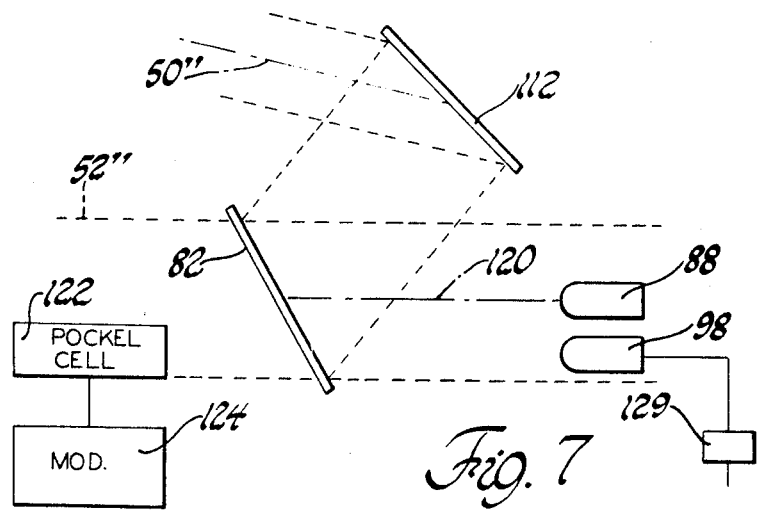
FIG. 7 is a modification of a portion of the apparatus shown in FIG. 3.
Figure 7A:
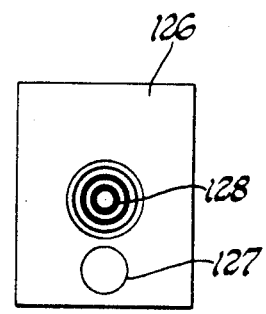
FIG. 7a shows the interference pattern produced by the system of FIG. 7.

A further modification of the system of FIG. 3 is shown in FIG. 7 and 7a. In this modification the bias voltage corresponding to the space average value of the intensity of wave energy in the interference pattern is developed by causing the interference pattern to move rapidly across the photodetector 98 and then taking the time-averages of the resulting signal. For this purpose the portion of the reference beam on path 50'' is reflected from a mirror 112 upon the front surface of the partially reflecting mirror 82 and redirected thereby into parallelism and coincidence with the portion of the object illuminating beam on path 52'' along an axis 120. Means for continuously shifting the phase of a portion of the object illuminating beam part 52'' such as a Pockel cell 122 is disposed in a portion of the beam and a continuously varying modulating voltage is applied thereto from a modulator 124. Thus, the temporal coherence of the beams is spoiled by that portion of the beam passing through the Pockel cell and the resulting fringes oscillate across the photodetector 98 at the frequency of the modulation. FIG. 7a shows the interference pattern as it would appear upon an imaginary screen 126. The interference pattern is comprised of an array of circular fringe lines 128. That portion of the pattern in alignment with the Pockel cell is formed of temporally incoherent waves and thus the time-averaged intensity thereof is substantially uniform over the entire area 127. Accordingly, the photocell 88 responds to the same interference pattern as described with reference to FIG. 3 and the photodetector 98 and time-averaging network 129 produce a signal corresponding to the space average value of the intensity of the reference and object beams.

Figure 8:
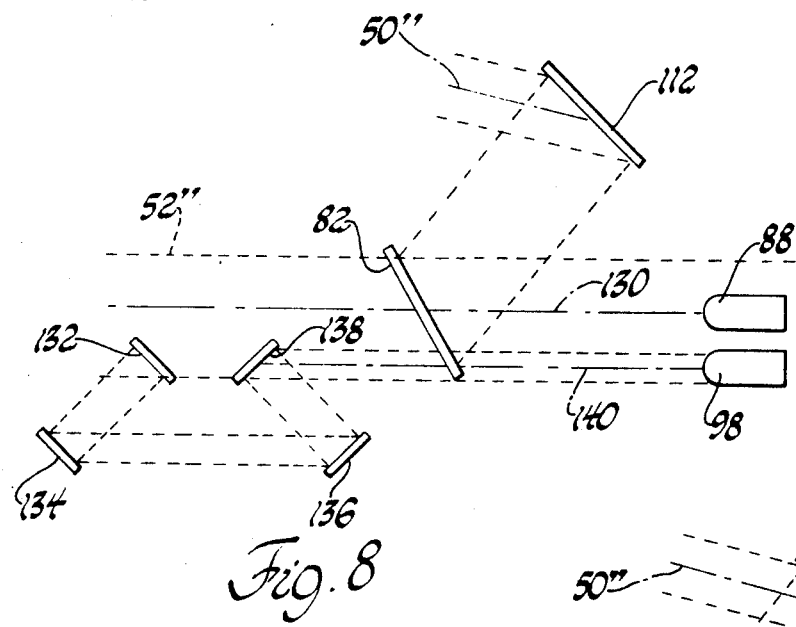
FIG. 8 is a further modification of a portion of the apparatus shown in FIG. 3.
Figure 8A:
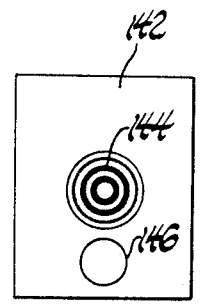
FIG. 8a shows the interference pattern produced by the apparatus of FIG. 8.

An additional modification of the apparatus, of FIG. 3, is illustrated in FIG. 8 and FIG. 8a. This modification utilizes an arrangement for spoiling the spatial coherence between the beams in order to produce a space average value of intensity. For this purpose the portion of the reference beam on path 50'' is reflected from a mirror 112 onto the front surface of the partly reflecting mirror 82 into parallelism and coincidence with the portion of the object illuminating beam on path 52'' along an axis 130. The photodetector 88 is positioned on the axis 130 and responds to the interference pattern produced by the beams. A portion of the object illuminating beam on path 52" impinges upon a mirror 132 and is reflected thereby through a beam path including mirrors 134, 136 and 138 from which it is redirected into parallelism with the axis 130. The beam path between mirrors 132 and 138 exceeds the coherence length of the laser 42 and thus is effective to spoil the coherence between the portion of the object illuminating beam on path 52" and the reference beam on path 50". Thus the beams are combined incoherently on an axis 140 with which the photodetector 98 is aligned. FIG. 8a shows the pattern the beams would project on an imaginary screen 142. The reference beam on path 50" and the object illuminating beam on path 52" along the axis 130 produces an interference pattern of circular fringe lines 144 as previously described. The combination of the beams on the axis 140 in an incoherent manner produces a field of illumination 146 of substantially uniform intensity and thus the photodetector 98 responds to the space average value of the reference and object illuminating beams.

Figure 9:
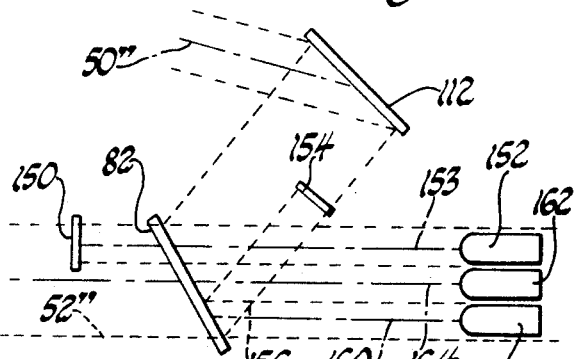
FIG. 9 is a further modification of the apparatus shown in FIG. 3.
Figure 10:
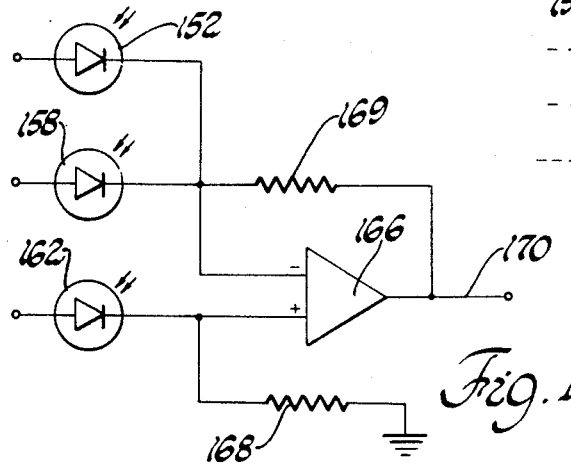
FIG. 10 is a modification for use with the apparatus of FIG. 9.

An additional modification of the apparatus of FIG. 3 is illustrated in FIGS. 9 and 10. This modification utilizes photodetector means for obtaining separate measurements of the intensities of the reference beam and the object illuminating beam. A signal corresponding to the space average value of the interference pattern of the reference beam and the object illuminating beam may be developed by taking the summation of signals corresponding to the intensities of the two beams. For this purpose an arrangement as shown in FIG. 9 is employed. The portion of the reference beam extending along the beam path 50" impinges upon a mirror 112 and is reflected thereby onto the front surface of the partially reflective mirror 82 and thence into parallelism with the portion of the object illuminating beam on path 52". A mask 150 positioned in a portion of the object illuminating beam on path 52" is aligned with a photodetector 152 on an axis 153 and thus the only wave energy impinging upon the optical input of photodetector 152 is that of the reference beam reflected from the mirror 82. Another mask 154 is suitably positioned between the mirrors 112 and 82 so that a portion of the reference beam 50" is blocked off along a path 156. Another photodetector 158 is positioned so that its optical input is disposed on the axis 160 of the path 156. Thus, only the wave energy of the object illuminating beam along path 52" impinges upon the optical input of the photodetector 158. A photodetector 162 is positioned with its optical input aligned with the axis 164 and thus receives the wave energy of the coincident reference beam and object illuminating beam and is responsive to the interference pattern thereof.

In order to utilize the signals produced by the photodetectors 152, 158 and 162 in the arrangement of FIG. 9, they are electrically connected in accordance with the schematic diagram of FIG. 10. The photodetector 152 and the photodetector 158 are electrically connected in parallel to one input of an operational amplifier 166 and thus the signal currents are additively combined at the input terminal of the amplifier. The photodetector 162 is connected with the other input of the amplifier 166 across an input resistor 168. The amplifier is provided with a feedback path through a resistor 169. Thus, the photodetector 162 provides an input signal to the amplifier corresponding to the intensity of a selected portion of the interference pattern produced by the reference beam and the object illuminating beam. The combined signals of photodetectors 152 and 158 produces a bias input for the amplifier 166 corresponding to the summation of the signals produced thereby in response to the intensity of the reference beam and the intensity of the object illuminating beam. Thus, the operational amplifier 166 produces an output 170 which corresponds to the difference of the input signals and hence corresponds to the phase shift produced by spurious motion of the object 40 or other elements of the apparatus.

It will now be appreciated that the invention affords an automatic control system for nullifying the effects of phase disturbance in holographic apparatus and may be embodied in many different forms. It is especially well adapted for eliminating effects of object motion during the time of exposure of the hologram. Although the phase correction means in the illustrative embodiment is shown as a movable mirror, it will be appreciated by those skilled in the art that it may take other forms. Phase correction may be produced by changing the physical length of the beam path or by changing the index of refraction of a portion of the beam path. In some applications the system may be implemented by the use of a Pockel cell in the beam path to shift the phase by changing the index of refraction.

Although the description of this invention has been given with respect to particular embodiments thereof, it is not to be construed in a limiting sense. Many variations and modifications will now occur to those skilled in the art. For a definition of the invention reference is made to the appended claims.

The embodiments of the invention in which an exclusive property or privilege is claimed are defined as follows:

1. In holographic apparatus of the type for making a hologram of an object and being substantially unaffected by spurious phase shift between reference and object beams, said apparatus including a source of coherent waves, means for forming a reference beam and an object illuminating beam, recording means positioned in the path of the reference beam and the path of an object beam derived from the object to record the wavefront interference pattern, means in the path of a portion of the object illuminating beam for imparting thereto the same unwanted phase disturbances as those affecting said object beam and for directing it into collinear relation with a portion of the reference beam thereby producing a circular fringe pattern, control means for producing a corrective phase shift between the reference beam and the object beam to nullify an unwanted phase shift, said control means including beam modifying means in the path of one of the reference and object beams for producing a phase shift therebetween which varies in direction and amplitude from a reference phase relation, said control means also including bias signal responsive means for establishing a quiescent point of operation and a control signal responsive means for actuating said beam modifying means in accordance with variations in sense and magnitude of a control signal relative to the quiescent point, a sensor disposed at a selected position relative to the fringe pattern for producing a control signal corresponding to the intensity of a selected portion of the fringe pattern and being connected with the control signal responsive means of said control means to apply the control signal thereto, the improvement comprising bias means connected with the bias signal responsive means of said control means and being responsive to the intensities of the reference and object beams for producing a bias signal corresponding to the effective space average intensity thereof for establishing the quiescent point of operation for said control means corresponding to said reference phase relation whereby the control means is effective to nullify an unwanted phase shift and is unresponsive to a change in intensity of said source.

2. The invention as defined in claim 1 wherein said bias means comprises a detector, means forming a portion of the interference pattern on the detector with the fringe lines thereof spaced such that the detector responds to an area large enough to include both constructive and destructive regions of the interference pattern.

3. The invention as defined in claim 2 wherein said bias means further comprises means directing the reference beam and the portion of the object illuminating beam in convergent paths with the detector positioned in an overlap region thereof.

4. The invention as defined in claim 2 wherein said bias means further comprises means directing the reference beam and the portion of the object illuminating beam parallel to each other along a common path with the detector being displaced radially outwardly from the axis thereof at a position where the fringe line spacing is less than the effective dimension of the detector.

5. The invention as defined in claim 1 wherein said bias means comprises a detector, means for combining the wavefronts of the reference beam and object illuminating beam on said detector and means for spoiling the coherence thereof.

6. The invention as defined in claim 1 wherein said bias means comprises a detector, means for combining the wavefronts of the reference and object illuminating beams on said detector and means for spoiling the temporal coherence thereof to produce an area of rapidly moving fringes which when averaged over a period of time yield the space-average of the intensity.

7. The invention as defined in claim 6 wherein the means for spoiling the temporal coherence comprises a phase shifter in one beam path for continuously shifting the phase of the beam therein.

8. The invention as defined in claim 5 wherein said means for spoiling the coherence comprises provision of a path length for one of the reference and object illuminating beams which exceeds the length of the other by an amount greater than the coherence length of the source of coherent waves.

9. The invention as defined in claim 1 wherein said bias means comprises a first detector disposed in the path of the reference beam for producing a signal corresponding thereto, a second detector disposed in the path of the object illuminating beam for producing a signal corresponding thereto, circuit means for combining said signals and connected with said control means for establishing the quiescent point of operation therefor.

10. Apparatus for producing a hologram substantially unaffected by spurious phase shift between the reference and object beams comprising a photographic plate adapted to record a wavefront interference pattern of an object beam and a reference beam, a laser for producing coherent waves for forming a reference beam to illuminate said photographic plate over a first path and for forming an object illuminating beam to form an object beam for illuminating said photographic plate over a second path, a reflector in the path of a portion of said object illuminating beam movable with said object, first optical means for directing a portion of the reference beam and said portion of the object illuminating beam in a direction parallel to each other along a common path, first photodetector means aligned with the common path and responsive to the intensity of a selected portion of the interference pattern of said portions of the object illuminating beam and the reference beam wavefronts for producing a control signal voltage corresponding to the phase relation of said beams, second optical means for directing a portion of the reference beam and said portion of the object illuminating beam into convergent paths, second photodetector disposed in an overlap region of the convergent paths and responsive to the effective space average intensity of the interference pattern for producing a bias signal voltage, control means for producing a corrective phase shift between the reference beam and the object beam to nullify an unwanted phase shift, said control means including a differential amplifier having first and second inputs, and electromechanical transducer connected with the output of said amplifier, means in the path of one of said reference and object beams for changing the effective path length thereof and connected with said transducer for actuation thereby, said second input of the differential amplifier being connected with the second photodetector and responsive to said bias signal voltage for establishing a quiescent point of operation for said amplifier and said control means corresponding to a reference phase relation between said object illuminating beam and the reference beam, said second input of the differential amplifier being connected with the second photodetector and being responsive to the control signal voltage produced thereby for energizing said transducer to produce a phase shift which varies in direction and amplitude from the reference phase relation with the variation in sense and magnitude about said quiescent point of operation, whereby the control means is effective to nullify an unwanted phase shift and is unresponsive to a change in intensity of said source.

11. The invention as defined in claim 10 wherein said first and second optical means comprise a pair of mirrors in one of the first and second beam paths for dividing the impinging beam into two nonparallel secondary beams impinging respectively on said first and second photodetectors and means for directing the other of said object and reference beams along the path of said secondary beams and in a direction parallel to the beam impinging on said first detector.

* * * * *